March 28, 1950     H. HIBBARD     2,501,940
DETACHABLE UTENSIL HANDLE
Filed Nov. 12, 1946
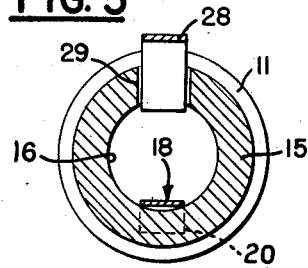
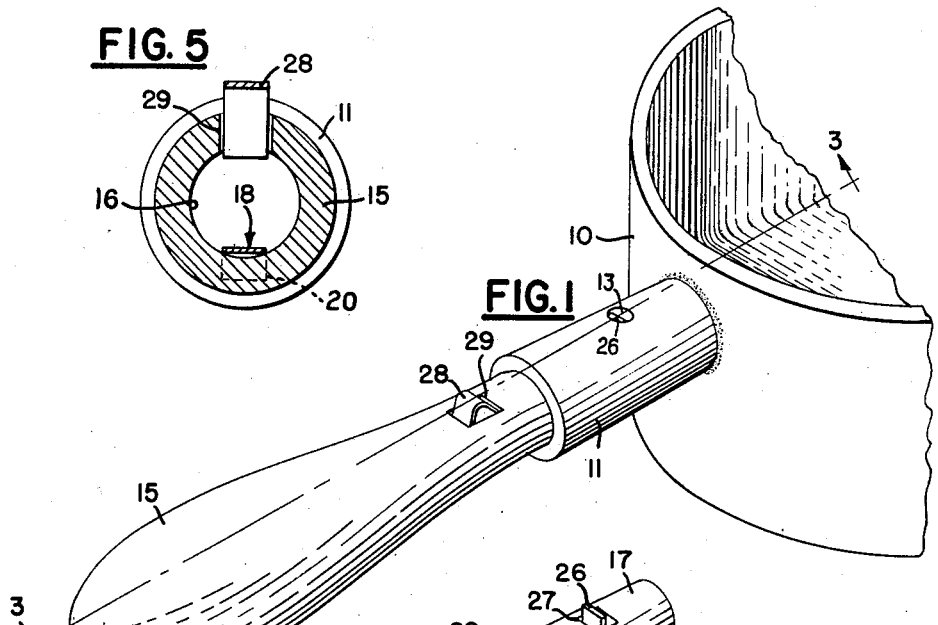
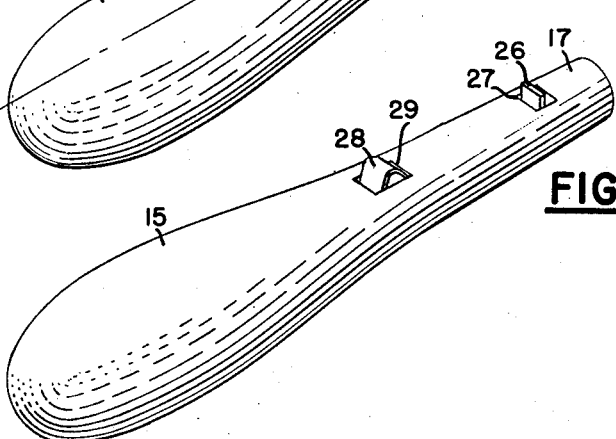
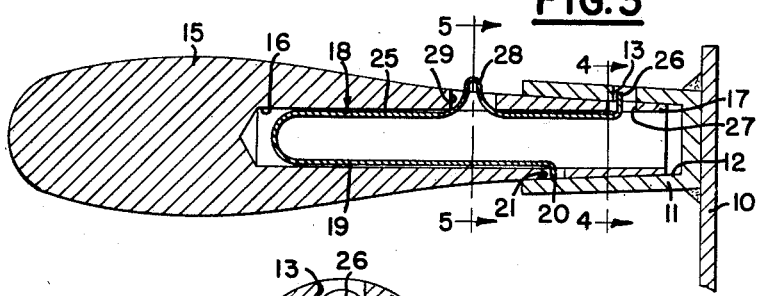
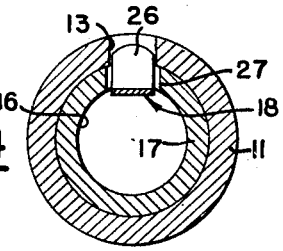
INVENTOR
HURL HIBBARD
BY
*Toulmin & Toulmin*
ATTORNEYS Patented Mar. 28, 1950

2,501,940

UNITED STATES PATENT OFFICE 2,501,940

DETACHABLE UTENSIL HANDLE

Hurl Hibbard, Dayton, Ohio

Application November 12, 1946, Serial No. 709,381

3 Claims. (Cl. 16—114)

This invention relates to handles adapted to be attached to utensils of various kinds, and particularly to handles adapted for attachment to cooking utensils.

An object of the invention is to provide an improved and simplified form of a handle that can be readily attached to and detached from a utensil.

Still another object of the invention is to provide a removable handle for a cooking utensil wherein a spring-actuated member is provided for detachably holding the handle upon a cooking utensil.

Further objects and advantages will become apparent from the drawings and the following description.

In the drawings:

Figure 1 is a perspective elevational view of a cooking utensil incorporating a detachable handle constructed in accordance with this invention.

Figure 2 is a perspective elevational view of the detachable handle of this invention.

Figure 3 is a longitudinal cross-sectional view taken along line 3—3 of Figure 1.

Figure 4 is a transverse cross-sectional view taken along line 4—4 of Figure 3.

Figure 5 is a transverse cross-sectional view taken along line 5—5 of Figure 3.

In this invention a utensil, such as a cooking pan 10 is provided with a stub-shank 11 suitably secured to the utensil 10. The stub-shank 11 is provided with a tapered internal bore 12 that has a hole 13 provided therein.

A removable handle 15 is adapted to be inserted within the bore 12 and is adapted to be removably locked in position therein.

The handle 15 is provided with an internal bore 16 that extends inwardly from the small end of the handle. The forward end 17 of the handle is provided with an external taper that cooperates with the internal tapered bore 12 of the stub-shank 11 to provide a seating surface between the internal bore of the stub-shank 11 and the forward end of the handle 15.

The latch for holding the handle 15 in place in the stub-shank 11 consists of a U-shaped leaf spring 18 inserted into the internal bore 16. The lower arm 19 of the spring 18 is provided with an outwardly turned end 20 that extends into a hole 21 provided in the handle 15 to retain the spring in position in the handle and prevent any substantial axial movement of the spring within the bore 16. The upper arm 25 of the spring 18 is provided with an upwardly turned end 26 adapted to engage the hole 13 in the stub-shank 11 and thereby latch the handle 15 in position in the stub-shank 11. The end 26 extends through a hole 27 provided in the handle 15 for this purpose.

The upper arm 25 of the spring 18 is also provided with an upwardly formed portion 28 which extends through an opening 29 provided in the handle 15. This portion 28 acts as a thumb-button to be engaged by the operator to move the upwardly turned portion 26 out of engagement with the recess 13 when it is desired to release the handle 15 from the stub-shank 11.

While the device disclosed and described herein illustrates a preferred form of the invention, yet it will be understood that it is capable of alteration without departing from the spirit of the invention, and that all modifications that fall within the scope of the appended claims are intended to be included herein.

Having thus fully described my invention, what I claim as new and desire to secure by Letters Patent is:

1. A releasable handle for releasably engaging a sleeve, said handle having a longitudinal recess providing walls extending at least partially longitudinally through said handle, said handle having a pair of spaced ports extending radially through the walls of said handle and communicating with said recess, said ports being on one side of said handle and extending substantially lengthwise of the handle, said handle having a third port extending radially through the wall of said handle and communicating with said recess, said third port being on the opposite side of said handle from said pair of ports, a U-shaped spring having parallel legs and having ends projecting in opposite directions, one of said ends extending through one of said pair of ports and the other end extending through said third port, the legs lying closely adjacent to the walls of the handle recess, said spring having a portion on one spring leg which extends through the other of said pair of ports in said handle, said portion being spaced from the projecting end on that spring leg, at least one of said ends of the spring being of such length as to engage a portion of the sleeve whereby when said portion is manually operated, said last named spring end may be disengaged from the sleeve to thereby release said handle therefrom.

2. A releasable handle for releasably engaging a sleeve, said handle having a longitudinal recess providing walls extending at least partially longitudinally through said handle, said handle having a pair of spaced ports extending radially through the walls of said handle and communicating with said recess, said ports being in a line extending substantially lengthwise of the handle, said handle having a third port extending radially through the wall of said handle and communicating with said recess, said third port being on the opposite side of said handle from said pair of ports, a U-shaped spring having parallel legs and having ends projecting in opposite directions, one of said ends extending through one of said pair of ports and the other end extending through said third port, the legs lying closely adjacent to the walls of the handle recess, said spring having a portion on one spring leg which extends through the other of said pair of ports in said handle, said portion being spaced from the projecting end on that spring leg, at least one of said ends of the spring being of such length as to engage a portion of the sleeve whereby when said portion is manually operated, said last named spring end may be disengaged from the sleeve to thereby release said handle therefrom.

3. A releasable handle for releasably engaging a sleeve, said handle having a longitudinal recess providing walls extending at least partially longitudinally through said handle, said handle having a pair of spaced ports extending radially through the walls of said handle and communicating with said recess, said ports being on one side of said handle and extending substantially lengthwise of the handle, said handle having a third port extending radially through the wall of said handle and communicating with said recess, said third port being on the opposite side of said handle from said pair of ports, a U-shaped spring having parallel legs and having ends projecting in opposite directions, one of said ends extending through one of said pair of ports and the other end extending through said third port, the legs lying closely adjacent to the walls of the handle recess, said spring having a portion on one spring leg which extends through the other of said pair of ports in said handle, said portion being spaced from the projecting end on that spring leg, at least one of said ends of the spring being of such length as to engage a portion of the sleeve whereby when said portion is manually operated, said last named spring end may be disengaged from the sleeve to thereby release said handle therefrom, said handle having a conical end which is adapted to fit within a conical recess of the sleeve.

HURL HIBBARD.

REFERENCES CITED

The following references are of record in the file of this patent:

UNITED STATES PATENTS

| Number | Name | Date |
|---|---|---|
| 427,835 | Chesterton | May 13, 1890 |
| 914,352 | Knapp | Mar. 2, 1909 |
| 929,974 | McNutt | Aug. 3, 1909 |
| 1,015,176 | Hall et al. | Jan. 16, 1912 |
| 1,635,119 | Dziuba et al. | July 5, 1927 |
| 2,064,397 | White | Dec. 15, 1936 |
| 2,420,866 | Coss | May 20, 1947 |

FOREIGN PATENTS

| Number | Country | Date |
|---|---|---|
| 319,664 | France | Mar. 17, 1902 |
| 348,238 | Great Britain | May 14, 1931 |